United States Patent
Hwang et al.

(10) Patent No.: US 10,481,947 B2
(45) Date of Patent: Nov. 19, 2019

(54) COMPUTING DEVICE FOR PROCESSING PARSING

(71) Applicant: TmaxData Co., Ltd., Gyeonggi-do (KR)

(72) Inventors: Changho Hwang, Gyeonggi-do (KR); Seungtak Choi, Gyeonggi-do (KR)

(73) Assignee: TMAXDATACO., LTD. (KR)

( * ) Notice: Subject to any disclaimer, the term of this patent is extended or adjusted under 35 U.S.C. 154(b) by 261 days.

(21) Appl. No.: 15/466,107

(22) Filed: Mar. 22, 2017

(65) Prior Publication Data
US 2018/0253418 A1 Sep. 6, 2018

(30) Foreign Application Priority Data
Mar. 3, 2017 (KR) .................. 10-2017-0027429

(51) Int. Cl.
*G06F 7/00* (2006.01)
*G06F 17/30* (2006.01)
*G06F 9/48* (2006.01)

(52) U.S. Cl.
CPC .................. *G06F 9/4843* (2013.01)

(58) Field of Classification Search
None
See application file for complete search history.

(56) References Cited

U.S. PATENT DOCUMENTS

| 2005/0223382 | A1 | 10/2005 | Lippett |
| 2008/0288761 | A1 | 11/2008 | Rivera |
| 2011/0314330 | A1* | 12/2011 | Morimura ............ G06N 5/025 714/26 |
| 2015/0142501 | A1* | 5/2015 | Nair ................. G06Q 10/06316 705/7.26 |

FOREIGN PATENT DOCUMENTS

| JP | 5327314 B | 10/2013 |
| KR | 1020120115553 A | 10/2012 |
| KR | 1020140134484 A | 11/2014 |

OTHER PUBLICATIONS

Korean Office Action, application, No. KR 10-2017-0027429, dated Dec. 17, 2017.

* cited by examiner

*Primary Examiner* — Tuan A Pham
(74) *Attorney, Agent, or Firm* — Fish IP Law, LLP (57) ABSTRACT

Disclosed is a computer program stored in a computer readable storage medium including encoded commands. When the computer program is executed by one or more processors of a computer system, the computer program enables the one or more processors to perform operations for parsing, and the operations include: receiving, by a dispatcher thread, an event; matching, by the dispatcher thread, information on a parsing rule corresponding to the event with the event, and storing the event and the matched information on the parsing rule in an event queue; fetching, by a parser thread, the event and the information on the parsing rule from the event queue; and processing, by the parser thread, the event according to the parsing rule corresponding to the event based on the information on the parsing rule.

8 Claims, 6 Drawing Sheets

| Address | Parsing Rule | Reference count |
|---------|--------------|-----------------|
| 1 | Rule 1 | 0 |
| 2 | Rule 2 | 3 |
| 3 | Rule 3 | 1 |

COMPUTING DEVICE FOR PROCESSING PARSING

CROSS-REFERENCE TO RELATED APPLICATIONS

This application claims priority to and the benefit of Korean Patent Application No. 10-2017-0027429 filed in the Korean Intellectual Property Office on Mar. 3, 2017, the entire contents of which are incorporated herein by reference.

TECHNICAL FIELD

The present disclosure relates to a computing device, and more particularly, to a computing device for processing parsing.

BACKGROUND ART

Parsing is one kind of data processing and means a series of processes processing data by a predetermined reference. For the parsing, there is a need for original data and a parsing rule corresponding to a predetermined reference for processing the original data.

The parsing rule may be corrected, changed, or updated. In this case, for consistency of a parsing process, a sharing resource, in which the parsing rule is stored, may require locking, or the reference by a thread, which processes the parsing process, may be stopped.

When the thread processing the parsing process for the sharing resource, in which the parsing rule is stored, refers to the parsing rule, consistency may be maintained by prohibiting a correction, a change, or an update of the parsing rule by using the lock for the corresponding parsing rule. However, the referring of the parsing rule by the thread processing the parsing process occupies most of the entire operation time, so that performance of the parsing process may be degraded by the lock.

As another method, consistency of the entire process may be maintained by correcting, changing, or updating the parsing rule when the thread processing the parsing process does not refer to the parsing rule. The method does not require the lock, but needs to stop the parsing process and then re-start the parsing process, so that performance of the parsing process may be additionally degraded.

Accordingly, a solution for maintaining consistency of the parsing process and preventing performance of the parsing process from being degraded is demanded.

RELATED ART LITERATURE

Korean Patent Application Laid-Open No. 10-2014-0134484 (Nov. 24, 2014)

SUMMARY OF THE INVENTION

The present disclosure has been made in an effort to provide a solution for preventing performance of a data process from being degraded.

An exemplary embodiment of the present disclosure provides a computer program stored in a computer readable storage medium including encoded commands. When the computer program is executed by one or more processors of a computer system, the computer program enables the one or more processors to perform operations for parsing, and the operations include: receiving, by a dispatcher thread, an event; matching, by the dispatcher thread, information on a parsing rule corresponding to the event with the event, and storing the event and the matched information on the parsing rule in an event queue; fetching, by a parser thread, the event and the information on the parsing rule from the event queue; and processing, by the parser thread, the event according to the parsing rule corresponding to the event based on the information on the parsing rule.

The parsing rule may be stored in a parsing rule map included in a memory, and the information on the parsing rule may include an address of the parsing rule in the parsing rule map.

The parsing rule map may store the parsing rule, each parsing rule may have a reference counter, and the reference counter may be updated when the parsing rule is referred by the event within the event queue.

The computer program may further include removing the parsing rule from the parsing rule map based on the reference counter of each parsing rule.

The reference counter may represent the number of events, which refer to the parsing rule, within the event queue, and the removing of the parsing rule from the parsing rule map based on the reference counter of each parsing rule may include: determining whether there is an event referring to the parsing rule within the event queue based on the reference counter; and when there is no event referring to the parsing rule within the event queue as a result of the determination, removing the parsing rule from the parsing rule map.

When the parsing rule is updated, in the parsing rule map, the updated parsing rule may be stored at a different position from a position of the existing parsing rule so that the updated parsing rule has a different address from an address of the existing parsing rule.

The processing, by the parser thread, of the event according to the parsing rule corresponding to the event based on the information on the parsing rule may include reading, by the parser thread, the parsing rule in the parsing rule map based on an address of the parsing rule included in the information on the parsing rule, and processing the event according to the read parsing rule.

The computer program may further include storing, by the dispatcher thread, the parsing rule in a parsing rule map.

The processing, by the parser thread, of the event according to the parsing rule corresponding to the event based on the information on the parsing rule may include: obtaining, by the parser thread, an address of the parsing rule included in the information on the parsing rule; reading, by the parser thread, a position in a parsing rule map indicated by the address of the parsing rule based on the address of the parsing rule and obtaining the parsing rule; and processing, by the parser thread, the event based on the obtained parsing rule.

Another exemplary embodiment of the present disclosure provides a parsing method performed by one or more processors of a computing device. The parsing method may include: receiving, by a dispatcher thread, an event; matching, by the dispatcher thread, information on a parsing rule corresponding to the event with the event, and storing the event and the matched information on the parsing rule in an event queue; fetching, by a parser thread, the event and the information on the parsing rule from the event queue; and processing, by the parser thread, the event according to the parsing rule corresponding to the event based on the information on the parsing rule.

Yet another exemplary embodiment of the present disclosure provides a computing device. The computing device may include: one or more processors; and a memory configured to store commands executable by the one or more processors, in which in the one or more processors, a dispatcher thread receives an event, the dispatcher thread matches information on a parsing rule corresponding to the event with the event, and stores the event and the matched information on the parsing rule in an event queue, a parser thread fetches the event and the information on the parsing rule from the event queue, and the parser thread processes the event according to the parsing rule corresponding to the event based on the information on the parsing rule.

The present disclosure may provide a solution for preventing performance of a data process from being degraded.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters are suggested in order to provide general understanding one or more aspects. However, it is apparent that the aspect(s) may be carried out without the specific and detailed matters. In other examples, publicly-known structures and devices are illustrated in a form of a block diagram for easy description.

DETAILED DESCRIPTION

Various exemplary embodiments will be described with reference to the accompanying drawings, and like reference numerals are used for designating like constituent elements throughout the specification. In the present specification, various descriptions are present for helping to understand the present disclosure. However, it is apparent that the exemplary embodiments may be carried out without a particular description. In other examples, publicly-known structures and devices are provided in a form of a block diagram in order to easily describe the exemplary embodiments.

Terms "component", "module", "system", and the like used in the present specification refer to a computer-related entity, hardware, firmware, software, a combination of software and hardware, or execution of software. For example, the component may be a processing process, a processor, an object, an execution thread, a program, and/or a computer executed in a processor, but is not limited thereto. For example, all of an application executed in a computing device and the computing device may be components. One or more components may reside within a processor and/or an execution thread, and one component may be localized within one computer, or distributed between two or more computers. Further, the components may be executed by various computer readable media having various data structures stored in the media. The components may communicate through local and/or remote processing according to, for example, a signal (for example, data transceived with another system through a network, such as the Internet, through data and/or a signal from one component interworking with another component in a local system and a distribution system) including one or more data packets.

Descriptions of the present exemplary embodiments are provided so that those skilled in the art may use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments present herein, and shall be interpreted within the broadest meaning range consistent to the principles and new characteristics present herein.

Figure 1A:
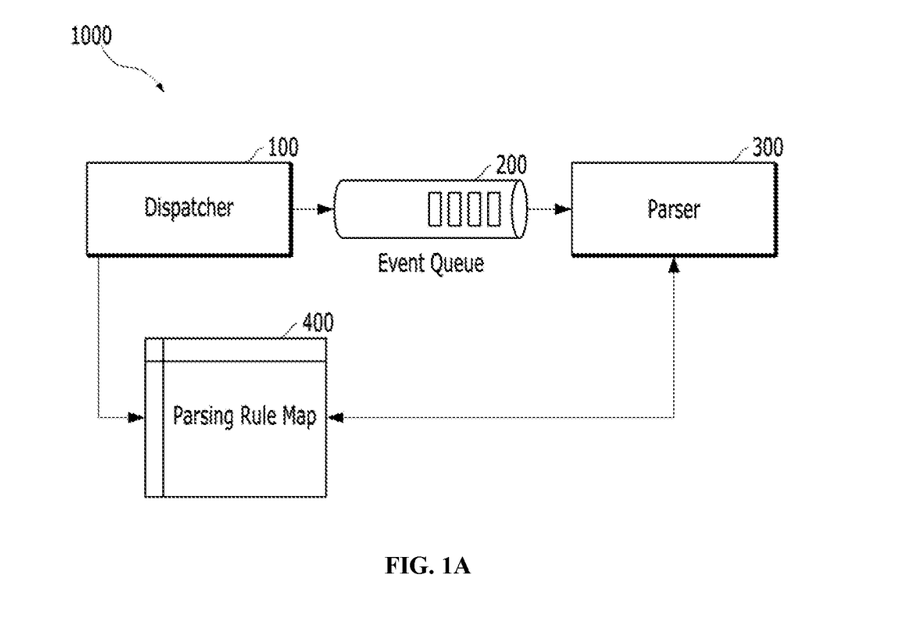
FIG. 1A is a diagram illustrating components for processing a data process according to an exemplary embodiment of the present disclosure.

FIG. 1A is a diagram illustrating components for processing a data process according to an exemplary embodiment of the present disclosure.

According to the exemplary embodiment of the present disclosure, a computing device 1000 for processing a data process may include a dispatcher thread 100, an event queue 200, a parser thread 300, and a parsing rule map 400.

The dispatcher thread 100 may receive a command message of a user and an event. Further, the dispatcher thread 100 may receive a parsing rule. The dispatcher thread 100 may register the parsing rule to a data structure in a memory, or correct or delete the parsing rule. The dispatcher thread 100 may record the parsing rule in the parsing rule map 400. Here, the event may include original data, on which a parsing process is to be performed. For example, the event may be a sentence, and the parsing rule is to separate the sentence in the unit of spacing. The aforementioned event and parsing rule are simply examples, and the present disclosure is not limited thereto.

The dispatcher thread 100 may store the received event in the event queue 200. In this case, the dispatcher thread 100 may match information on the parsing rule corresponding to the event with the event and store the information on the parsing rule matched with the event in the event queue. Here, the information on the parsing rule may include a reference address of the parsing rule in the parsing rule map 400. For example, when an event Event 1 is received and a parsing rule Rule 1 corresponding to the event Event 1 has an address Address 1 in the parsing rule map 400, the dispatcher thread 100 may match the event with information on the parsing rule corresponding to the event (for example, (Event 1, address 1)) and store the matched event and information in the event queue 200.

When the parsing rule is corrected, changed, or updated, the dispatcher thread 100 may store a new parsing rule at a different position from that of the existing parsing rule so as that the new parsing rule has a different address from that of the existing parsing rule. For example, when the parsing rule is changed from the parsing rule Rule 1 to a parsing rule Rule 2 based on an input of a user and the like in the aforementioned example, the computing device 1000 may process the events after the change of the parsing rule according to the parsing rule Rule 2. In this case, the dispatcher thread 100 may store the new parsing rule Rule 2 at a different position (for example, address 2) from that of the parsing rule Rule 1 so that the new parsing rule Rule 2 has a different address from that of the existing parsing rule Rule 1 (for example, address 1). According to the exemplary embodiment of the present disclosure, the new parsing rule is stored at the different position from that of the existing parsing rule, so that when the parsing rule is changed, it is not necessary to stop the parsing process or waits for a release of the lock of the sharing resource of the parsing process, thereby maintaining consistency of the parsing process. Accordingly, according to the exemplary embodiment of the present disclosure, it is possible to maintain consistency of the process and prevent performance of the process from being degraded, thereby improving the entire performance.

Figure 2:
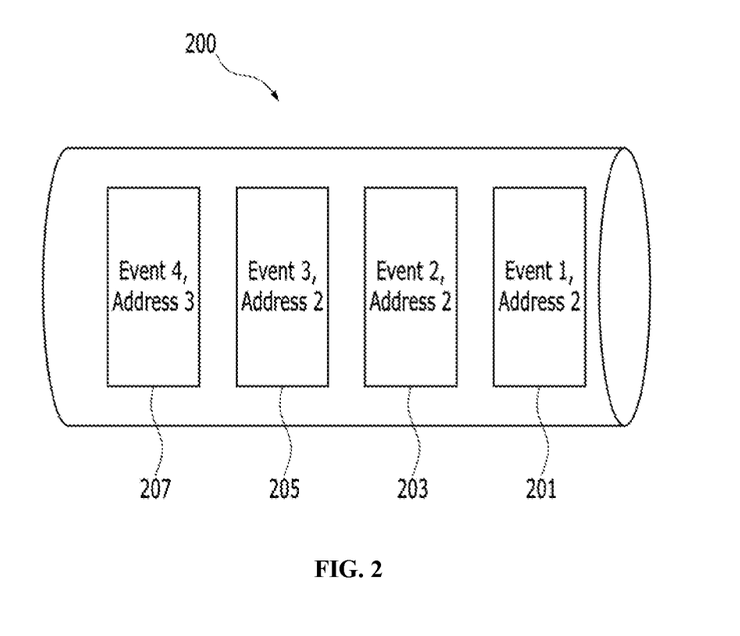
FIG. 2 is an exemplary diagram illustrating an event queue among the components processing the data process according to the exemplary embodiment of the present disclosure.

The event queue 200 may store an event and information on a parsing rule matched with the event. The event queue 200 may be formed of at least one of a predetermined space of a main memory, a cache of a processor, and a permanent storage device. The computing device 1000 according to the exemplary embodiment of the present disclosure may include the event queue 200 between the dispatcher thread 100 and the parser thread 300 for real-time parsing performance to implement a pipelining process. Referring to FIG. 2, the event queue 200 may store the event and the information on the parsing rule matched with the event, which are received from the dispatcher thread 100. FIG. 2 illustrates an example of the event queue 200 storing event 1 to event 4 201, 203, 205, and 207, and the illustration of FIG. 2 is simply an example, and does not limit the present disclosure. The event and the information on the parsing rule matched with the event may be stored in the event queue 200 in an input sequence. In the example of FIG. 2, reference numeral 201 is a diagram illustrating the case where the event Event 1 is matched with the address Address 2 representing a storage address in the memory of a parsing rule corresponding to the corresponding event and is stored in a memory.

The parser thread 300 may fetch the event and the information on the parsing rule from the event queue 200. The parser thread 300 may process the event according to the parsing rule corresponding to the event based on the information on the parsing rule. The parser thread 300 is a thread, which is capable of parsing-processing the event according to the parsing rule. The parser thread 300 may obtain the event from the event queue 200, and obtain the parsing rule by referring to the parsing rule map 400 based on the address obtained from the information on the parsing rule matched with the event, which is stored in the event queue. For example, referring to the example illustrated in FIG. 2, the parser thread 300 may fetch the events stored in the event queue 200 in a sequence and process the events. The parser thread 300 may fetch the event Event 1 201 from the event queue 200, and read the parsing rule map 400 based on the address Address 2 of the parsing rule matched with the event Event 1 and obtain the parsing rule Rule 2 for processing the event Event 1. The parser thread 300 may process the obtained event based on the obtained parsing rule. According to the exemplary embodiment of the present disclosure, the parser thread 300 reads the event and the address of the parsing rule corresponding to the matched event and obtains the parsing rule, so that it is not necessary to scan the entirety of the parsing rule map or the entirety of the memory for obtaining the parsing rule, thereby improving general performance. Further, the parser thread 300 obtains the parsing rule through the address of the parsing rule matched with the event, and when the parsing rule is changed, the dispatcher thread 100 matches an address of a new parsing rule with the event and stores the matched address and event in the event queue, so that the entire system may flexibly deal with the case where the parsing rule is changed.

Figure 3:
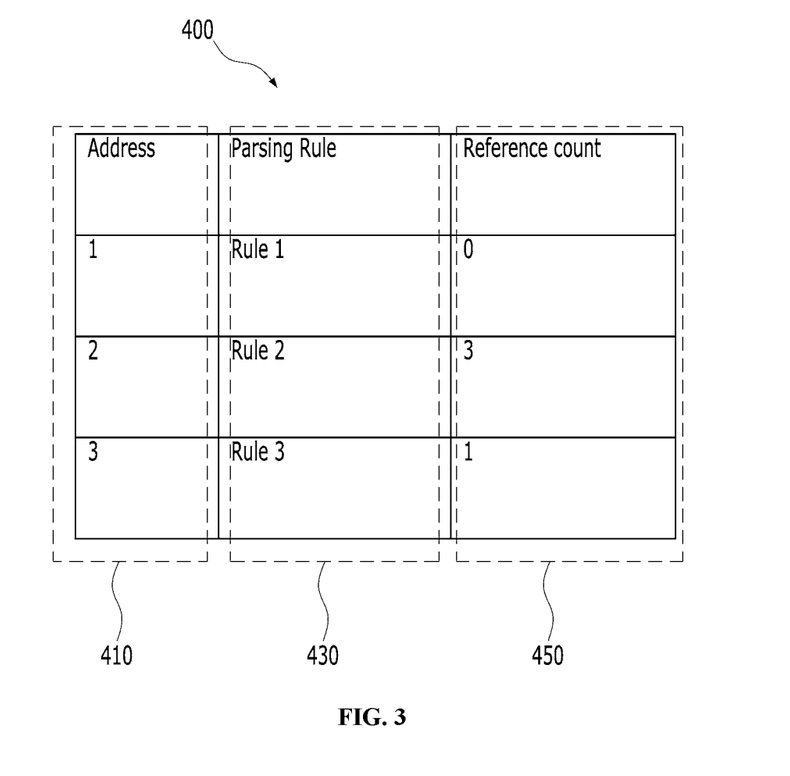
FIG. 3 is an exemplary diagram illustrating a parsing rule map among the components processing the data process according to the exemplary embodiment of the present disclosure.

The parsing rule map 400 may be positioned in a memory, a cache of a processor, or a permanent storage medium. The parsing rule map 400 may be a space in the memory, in which the parsing rule is stored. FIG. 3 is a diagram schematically illustrating the parsing rule map 400. Referring to FIG. 3, each parsing rule may have an address 410, a parsing rule 430, and a reference counter 450. The parsing rule map 400 may store the parsing rule, and the parsing rules may be stored at different positions so as to have different addresses. When the parsing rule is updated, the parsing rule map 400 may store a new parsing rule at a different position from that of the existing parsing rule so that the existing parsing rule has a different address from that of the new parsing rule. For example, referring to FIG. 3, when the parsing rule is changed from the parsing rule Rule 1 to the parsing rule Rule 2, the parsing rule Rule 2 may be stored at a different position from that of the parsing rule Rule 1. Further, the events generated after the change of the parsing rule may be processed by the parsing rule Rule 2. The parser thread 300 obtains the parsing rule through the address of each parsing rule, so that even when the parsing rule is changed, it is possible to maintain consistency without degradation of the performance by storing the different parsing rule at the different position.

The reference counter 450 may correspond to each parsing rule, and may represent whether the parsing rules are referred by the events, respectively. For example, when the parsing rule is referred by the event within the event queue, the reference counter 450 may have a value representing the number of events, and when the parsing rule is not referred by the event, the reference counter 450 may have a value of 0. Further, the reference counter 450 may be increased when being referred by the event, and may also be decreased when not being referred for a predetermined time. The reference counter 450 according to the exemplary embodiment of the present disclosure may represent whether each parsing rule is referred by the event with various methods. When it is determined that there is no event referring to the parsing rule based on the reference counter 450, the computing device 1000 may remove the corresponding parsing rule from the parsing rule map 400. The operation of removing the unnecessary parsing rule from the parsing rule map may be performed by the dispatcher thread 100, an OS system, a background thread, and the like. The unnecessary parsing rule is removed from the parsing rule map 400, thereby efficiently managing the memory. In this case, the computing device 1000 has the reference counter 450, so that it is possible to efficiently manage the memory without degrading stability of the system. For example, in the example of FIG. 3, the parsing rule Rule 1 referred by the event does not exist any longer, so that the reference counter is 0 and thus the parsing rule Rule 1 may be removed later. The parsing rule Rule 2 is referred by the events Event 1, Event 2, and Event 3, so that the reference counter 450 may be 3 so as to represent the reference. The parsing rule Rule 3 is the parsing rule of the event Event 4 in the example of FIG. 2, so that the reference counter of the parsing rule Rule 3 may be 1. Accordingly, the computing device 1000 may remove only the parsing rule Rule 1 having the reference counter of 0. The aforementioned reference counter 450 is simply an example, and the reference counter 450 may have a predetermined value for discriminating a parsing rule, which the computing device 1000 needs to remove, and a parsing rule, which the computing device 1000 needs not to remove.

According to the exemplary embodiment of the present disclosure, the computing device 1000 may match an event with an address of a parsing rule for processing the corresponding event and store the matched event and address in the event queue 200, so that the parser thread 300 may process the parsing process with the corresponding parsing rule even without scanning the entire parsing rules. Further, a different parsing rule is stored at a different position so as to have a different address, so that when the parsing rule is change, the parser thread 300 performs its operation process (obtain the parsing rule through the address) without a need for stopping the process, thereby maintaining consistency of the process without the degradation of performance. Further, each parsing rule is managed based on the reference counter, so that it is possible to efficiently manage the memory without stopping the process while maintaining consistency.

Figure 1B:
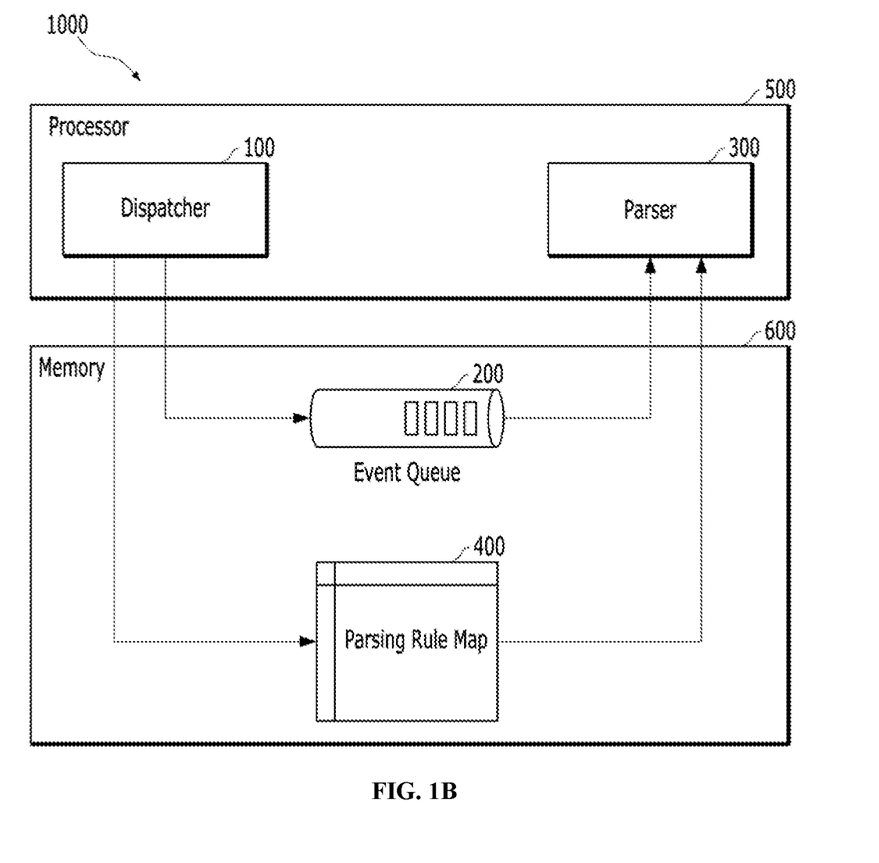
FIG. 1B is a diagram illustrating components for processing a data process according to an exemplary embodiment of the present disclosure.

FIG. 1B is a diagram illustrating components for processing a data process according to the exemplary embodiment of the present disclosure.

FIG. 1B is an example of the hardware implementation of the components of FIG. 1A, and the operation of each of the components has been described with reference to FIG. 1A.

The dispatcher thread 100 and the parser thread 300 may be formed of a core or a thread of a processor 500. The dispatcher thread 100 and the parser thread 300 may be formed of different cores, or may also be formed of the same core.

The event queue 200 and the parsing rule map 400 may be positioned in at least one of a main memory 600, a cache of the processor, and a permanent storage device. FIG. 1B is an exemplary diagram illustrating an exemplary embodiment, in which the event queue 200 and the parsing rule map 400 are implemented in the memory 600.

The components described herein are illustrative, and other additional components may be included.

FIG. 2 is a diagram illustrating the event queue among the components processing the data process according to the exemplary embodiment of the present disclosure.

The event queue 200 may store the events 201, 203, 205, and 207 and the information on the parsing rules, which are matched with the events, respectively. The event queue 200 may be formed of in one of a main memory, a cache of a processor, and a permanent storage medium.

The information on the parsing rule may include an address of the parsing rule in the parsing rule map, and may be matched with each event by the dispatcher thread 100.

In the example of FIG. 2, the event EVENT 1 may be matched with the address Address 2 and stored in the event queue 200 so that the event EVENT 1 is processed by the parsing rule positioned in the address Address 2. The event EVENT 4 may be processed by the parsing rule positioned in the address Address 3, and the parsing rule positioned in the address Address 2 may be different from the parsing rule positioned in the address Address 3. Each event is matched with an address of a parsing rule and is stored, so that the parser thread 300 does not need to scan the entire memory for obtaining a parsing rule corresponding to each event, and obtains a parsing rule matched with each event, thereby processing the process.

FIG. 3 is a diagram illustrating the parsing rule map among the components processing the data process according to the exemplary embodiment of the present disclosure.

The parsing rule map 400 may store the parsing rules, and may be implemented in any one of the main memory, the cache of the processor, and a permanent storage device.

The different parsing rules may be stored at different positions in the parsing rule map so as to have different addresses 410. The parsing rules stored in the parsing rule map 400 may be referred by the parser thread 300, and the parser thread 300 may refer to an accurate parsing rule of each event through the parsing rule address stored in the event queue 200. The different parsing rules are stored at the different positions so as to have the different addresses, so that even when the parsing rule is changed, the entire system may deal with the change of the parsing rule.

Each of the parsing rules may have the reference counter 450. The reference counter 450 may represent whether a corresponding parsing rule is referred by the events. In the example of FIG. 3, there is no event referring to the parsing rule Rule 1, so that the reference counter 450 may have a value of 0. The parsing rules Rules 2 and 3 are referred by the events within the event queue, so that the reference counter may have a value of 1 or more. The parsing rules, which are not referred by the parser thread and do not need to be maintained, may be removed from the parsing rule map 400 for efficiency of the management of the memory. The computing device 1000 may determine whether each parsing rule needs to be removed based on the reference counter 450, and remove the parsing rule, which is not referred by the parser thread 300 or does not need to be referred (the parsing rule before the change and the like), among the parsing rules.

The computing device 1000 removes the parsing rule, which is not referred by the parser thread 300, based on the reference counter 450, so that it is possible to efficiently manage the memory, and improve performance of the system without a need for stopping the process for the removal.

Figure 4:
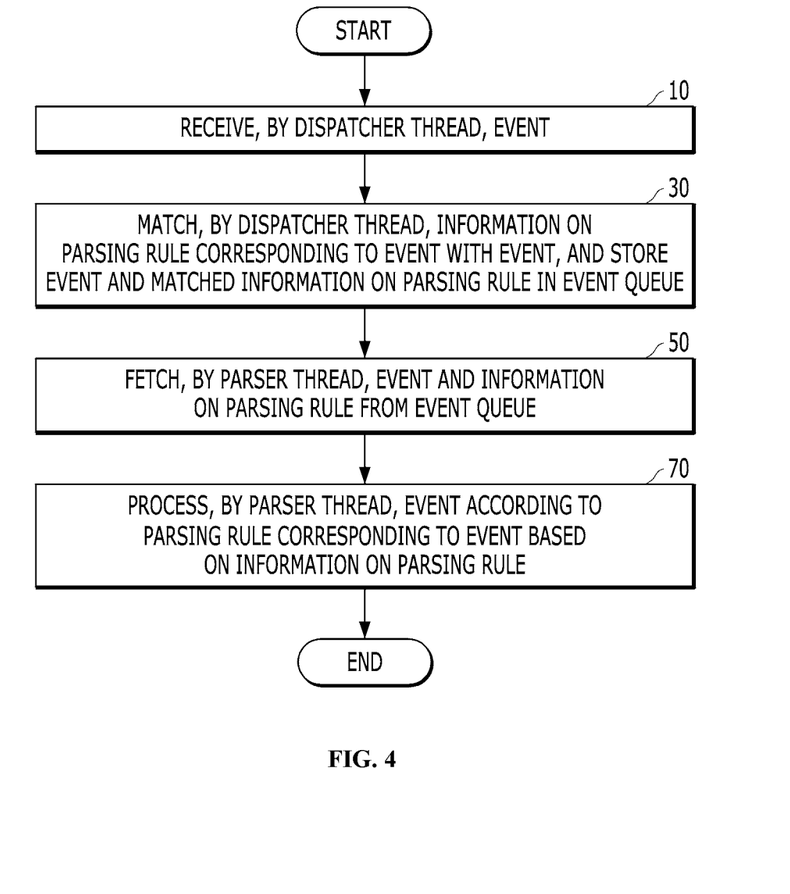
FIG. 4 is a flowchart illustrating a processing of a data process according to an exemplary embodiment of the present disclosure.

FIG. 4 is a flowchart illustrating a processing of a data process according to an exemplary embodiment of the present disclosure.

The dispatcher thread 100 may receive an event (10). The event may include original data which is to be processed by the computing device 1000. Further, the dispatcher thread 100 may receive a parsing rule and store the received parsing rule in the parsing rule map 400.

The dispatcher thread 100 may match the received event with information on a parsing rule corresponding to the event, and store the event and the matched information on the parsing rule in the event queue (30). According to the exemplary embodiment of the present disclosure, the event queue 200 is included between the dispatcher thread 100 and the parser thread 300, so that pipelining processing is available, thereby improving performance.

The parser thread 300 may fetch the event and the information on the parsing rule from the event queue 200 (50). The information on the parsing rule may include information on an address in the memory, in which the parsing rule corresponding to the event is stored. The information on the parsing rule may include information, based on which the parser thread 300 may identify the parsing rule corresponding to the event.

The parser thread 300 may process the event according to the parsing rule corresponding to the event based on the information on the parsing rule (70). The parser thread 300 may read the address of the parsing rule from the information on the parsing rule, obtain the parsing rule of the corresponding address, and process the event according to the parsing rule.

According to the exemplary embodiment of the present disclosure, the computing device 1000 may match the event with the address of the parsing rule for processing the corresponding event and store the matched event and address in the event queue 200, so that the parser thread 300 may process the parsing process with the corresponding parsing rule even without scanning the entire parsing rules. Further, a different parsing rule is stored at a different position so as to have a different address, so that when the parsing rule is change, the parser thread 300 performs its operation process (obtains the parsing rule through the address) without a need for stopping the process, thereby maintaining consistency of the process without the degradation of performance. Further, each parsing rule is managed based on the reference counter, so that it is possible to efficiently manage the memory without stopping the process while maintaining consistency.

Figure 5:
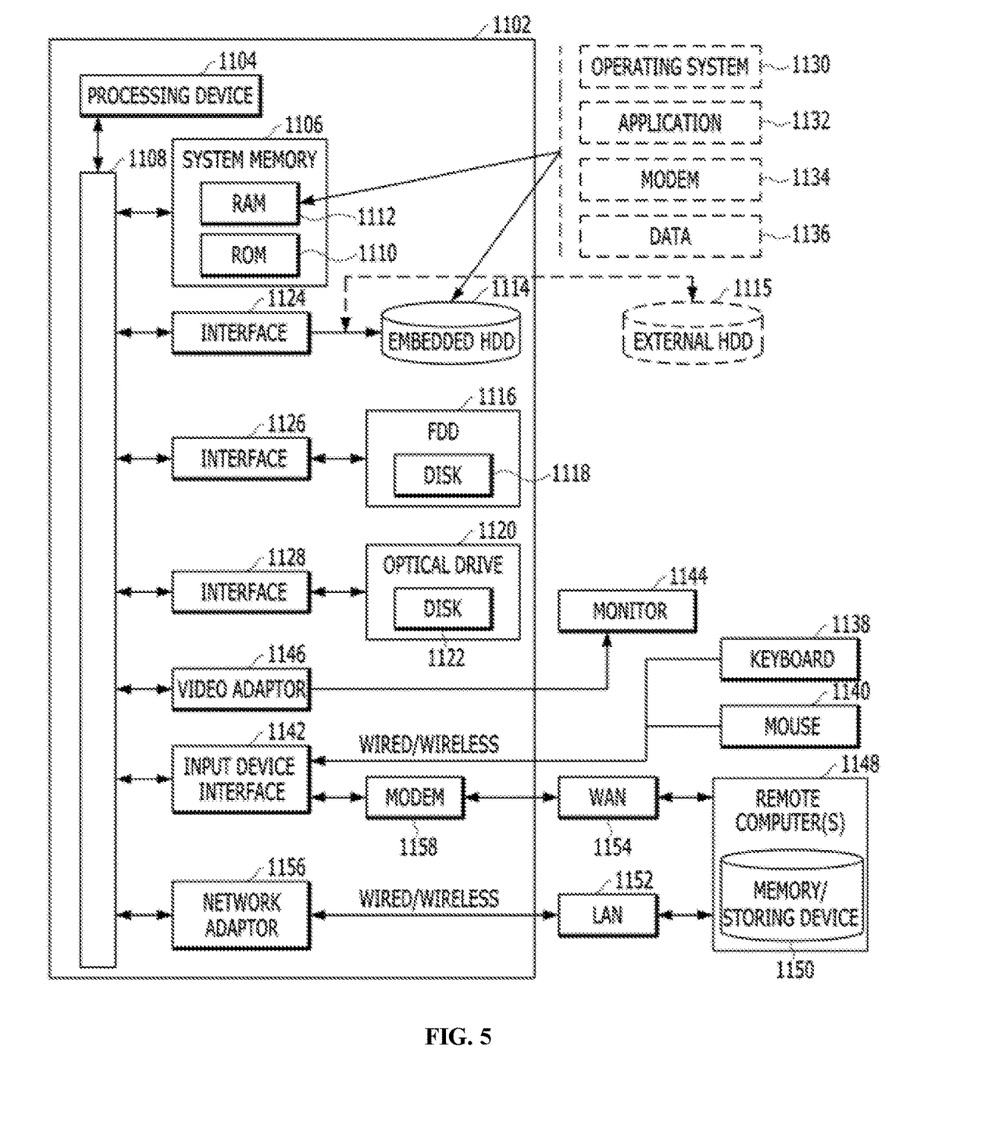
FIG. 5 is a block diagram of a computing device according to an exemplary embodiment of the present disclosure.

FIG. 5 is a block diagram of the computing device according to an exemplary embodiment of the present disclosure.

FIG. 5 is a simple and general exemplary diagram for an exemplary computing environment, in which the exemplary embodiments of the present disclosure are implementable.

The present disclosure has been described in relation with one or more commands, which are generally executable commands executable in a computer, but those skilled in the art may well understand that the present disclosure may be implemented with cooperation with other program modules and/or a combination of hardware and software.

In general, the program module includes a routine, a program, a component, a data structure, and the like, which perform a specific task or implement a specific abstract data type. Further, those skilled in the art may well understand that the method of the present disclosure may be carried out by other computer system configurations including a personal computer, a hand-held computing device, a microprocessor-based or programmable electronic product, and the like (each of which may be connected with one or more related devices and operated), as well as a single-processor or multi-processor computer system, a mini computer, and a main frame computer.

The described exemplary embodiments of the present disclosure may also be carried out in a distributed computing environment, in which specific tasks are performed by remote processing devices connected through a communication network. In the distributed computing environment, a program module may be positioned in both a local memory storage device and a remote memory storage device.

A computer generally includes various computer readable media. Any kind of medium accessible by the computer may be the computer readable medium, and the computer readable medium includes volatile and non-volatile media, transitory and non-transitory media, and removable and non-removable media. As a non-limited example, the computer readable medium may include a computer readable storage medium and a computer readable transport medium. The computer readable storage medium includes volatile and non-volatile media, transitory and non-transitory media, and removable and non-removable media which are implemented by a predetermined method or technology for storing information, such as a computer readable command, a data structure, a program module, or other data. The computer storage medium includes a random access memory (RAM), a read only memory (ROM), an electrically erasable and programmable read only memory (EEPROM), a flash memory, or other memory technologies, a compact disk read only memory (CD-ROM), a digital video disk (DVD), or other optical disk storage devices, magnetic cassette, a magnetic tape, a magnetic disk storage device, or other magnetic storage device, or other predetermined media which are accessible by a computer and are usable for storing desired information, but is not limited thereto.

The computer readable transport medium generally implements a computer readable command, a data structure, a program module, or other data in a modulated data signal, such as a carrier wave or other transport mechanism, and includes all of the information transport media. The term of the modulated data signal means a signal, of which one or more of the characteristics of the signal are set or changed so as to encode information in the signal. As a non-limited example, the computer readable transport medium includes a wired medium, such as a wired network or a direct-wired connection, and a wireless medium, such as a sound, a radio frequency (RF), infrared rays, and other wireless media. A combination of some of the aforementioned media is also included in the range of the computer readable transport medium.

FIG. 5 illustrates an exemplary environment 1100 implementing various aspects of the present disclosure including a computer 1102, and the computer 1102 includes a processing device 1104, a system memory 1106, and a system bus 1108. The system bus 1108 connects the system components including the system memory 1106 (the present disclosure is not limited thereto) to the processing device 1104. The processing device 1104 may be a predetermined processor among various commercial processors. A dual processor or other multiprocessor architectures may also be used as the processing device 1104.

The system bus 1108 may be any one among the several types of bus structure which may be additionally connected to a local bus using a predetermined one among a memory bus, a peripheral device bus, and various commercial bus architectures. The system memory 1106 includes a ROM 1110 and a RAM 1112. A basic input/output system (BIOS) is stored in a non-volatile memory 1110, such as an ROM, an erasable and programmable read only memory (EPROM), and an EEPROM, and the BIOS includes a basic routine which helps the transmission of information between the constituent elements within the computer 1102 at a time, such as the start of the computer 1102. The RAM 1112 may also include a high-speed RAM, such as a static RAM, for caching data.

The computer 1102 also includes an embedded hard disk drive (HDD) 1114 (for example, enhanced integrated drive electronics (EIDE) and serial advanced technology attachment (SATA)), the embedded hard disk drive 1114 being configurable for the removable usage within an appropriate chassis (not illustrated), a magnetic floppy disk drive (FDD) 1116 (for example, for reading data from a removable diskette 1118 or recording data in the removable diskette 1118), and an optical disk drive 1120 (for example, for reading a CD-ROM disk 1122, or reading data from other high capacity optical media, such as a digital video disk (DVD) or recording data in other high capacity optical media). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing a removable drive includes at least one of or both a universal serial bus (USB) and an institute of electrical and electronics engineers 1394 (IEEE 1394) interface technology.

The drives and the computer readable media related with the drives provide the non-volatile storage of data, a data structure, a computer executable command, and the like. In the case of the computer 1102, the drive and the medium correspond to the storage of predetermined data in an appropriate digital form. In the description of the computer readable medium, the HDD, the removable magnetic disk, and the removable optical media, such as a CD or a DVD, have been mentioned, but those skilled in the art may well understand that another type of computer readable media, such as a zip drive, a magnetic cassette, a flash memory card, and a cartridge, is also usable in an exemplary operation environment, and the predetermined medium may include a computer executable command for performing the methods of the present disclosure.

A plurality of program modules including an operation system 1130, one or more application programs 1132, other program modules 1134, and program data 1136 may be stored in the drive and the RAM 1112. The entirety or a part of the operation system, the application, the module, and/or the data may also be cached in the RAM 1112. Those skilled in the art may well understand that the present disclosure may be implemented in various commercially available operation systems or a combination of the operation systems.

A user may input a command and information to the computer 1102 through one or more wired/wireless input devices, for example, a keyboard 1138, and a pointing device, such as a mouse 1140. Other input devices (not illustrated) may include a microphone, an infrared (IR) remote controller, a joystick, a game pad, a stylus pen, a touch screen, and the like. The input devices and other input devices are frequently connected to the processing device 1104 through an input device interface 1142 connected to the system bus 1108, but may be connected by other interfaces, such as a parallel port, an IEEE 1394 serial port, a game port, a USB port, and an IR interface.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as a remote computer(s) 1148, through wired/wireless communication. The remote computer(s) 1148 may be a workstation, a computing device computer, a router, a personal computer, a portable computer, a microprocessor-based game device, a peer device, or other general network nodes, and generally includes a plurality of or the entirety of the constituent elements described for the computer 1102, but for simplicity, only a memory storage device 1150 is illustrated. The illustrated logical connection includes a wired/wireless connection to a local area communication network (LAN) 1152 and/or a larger network, for example, a wide area network (WAN) 1154. The LAN and WAN networking environments are general in an office and a company, and make an enterprise-wide computer network, such as an intranet, be easy, and all of them may be connected to the worldwide computer network, for example, the Internet.

When is used in the LAN networking environment, the computer 1102 is connected to a local network 1152 through a wired and/or wireless communication network interface or an adapter 1156. The adapter 1156 may make wired or wireless communication with the LAN 1152 be easy, and the LAN 1152 also includes a wireless access point for communicating with the wireless adapter 1156 installed in the wireless adapter 1156. When is used in the WAN networking environment, the computer 1102 may include a modem 1158, may be connected to a communication computing device in the WAN 1154, or has other means setting communication through the WAN 1154, such as the connection through the Internet. The modem 1158, which may be an embedded or outer mounted wired or wireless device, is connected to the system bus 1108 through the serial port interface 1142. In the networked environment, the program modules or a part of the program modules described for the computer 1102 may be stored in the remote memory/storage device 1150. The illustrated network connection is illustrative, and those skilled in the art may well understand that other means, which set a communication link between the computers, may be used.

The computer 1102 communicates with a predetermined wireless device or entity, for example, a printer, a scanner, a desktop and/or portable computer, a portable data assistant (PDA), a communication satellite, predetermined equipment or a place related with a wirelessly detectable tag, and a telephone, which is disposed and operated through wireless communication. This includes wireless fidelity (Wi-Fi) and Bluetooth wireless technologies at least. Accordingly, the communication may have a predefined structure in a network in the related art, or may be simply ad hoc communication between at least two devices.

The Wi-Fi enables a connection to the Internet and the like without a wire. The Wi-Fi is a wireless technology, such as a cellular phone, enabling the device, for example, a computer, to transmit and receive data in an indoor place and an outdoor place, that is, any place within communication coverage of a base station. A Wi-Fi network uses a wireless technology, IEEE 802.11 (a, b, g, and the like) for providing a safe, reliable, and high-speed wireless connection. The Wi-Fi may be used for connecting the computers to the computers, the Internet, and the wired network (using IEEE 802.3 or the Ethernet). The Wi-Fi network may be operated in unauthorized 2.4 and 5 GHz wireless bands at a data rate of, for example, 11 Mbps (802.11a) or 54 Mbps (802.11b), or may be operated in a product including both bands (dual bands).

Those skilled in the art may understand that information and signals may be expressed by using predetermined various different technologies and schemes. For example, data, directions, commands, information, signals, bits, symbols, and chips, which may be referred in the foregoing description, may be expressed by voltages, currents, electromagnetic waves, magnetic fields or particles, optical fields or particles, or a predetermined combination thereof.

Those skilled in the art may understand that various exemplary logical blocks, modules, processors, means, circuits, and algorithm steps described in relation with the exemplary embodiments disclosed herein may be implemented by electronic hardware, various types of program or design codes (for convenience, referred to as "software" herein), or a combination thereof. In order to clearly describe inter-compatibility of hardware and software, various exemplary components, blocks, modules, circuits, and steps have been generally described above in relation to the functions thereof. Whether the function is implemented as hardware or software depends on design limitations imposed to a specific application and the entire system. Those skilled in the art may implement the described functions with various methods for each specific application, but the determination of the implementation shall not be construed to depart from the scope of the present disclosure.

Various exemplary embodiments present herein may be implemented a manufactured article using a method, an apparatus, a standard programming, and/or an engineering technology. A term "manufactured article" includes a computer program, a carrier, or media accessible by a predetermined computer readable device. For example, the computer readable medium includes a magnetic storage device (for example, a hard disc, a floppy disc, and a magnetic strip), an optical disc (for example, a CD and a DVD), a smart card, and a flash memory device (for example, an EEPROM, a card, a stick, and a key drive), but is not limited thereto. Further, various storage media present herein include one or more devices and/or another machine-readable medium for storing information. A term "machine-readable medium" includes a wireless channel and other various media capable of storing, possessing, and/or transporting a command(s) and/or data, but is not limited thereto.

It shall be understood that a specific sequence or a hierarchy structure of the steps included in the present processes is an example of exemplary accesses. It shall be understood that based on a design priority, a specific sequence or a hierarchy structure of the steps included in the present processes may be re-arranged within the scope of the present disclosure. The accompanying method claims provide elements of various steps as a sample sequence, but do not mean the limitation to the present specific sequence or hierarchy structure.

Descriptions of the present exemplary embodiments are provided so that those skilled in the art may use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics present herein.

What is claimed is:

1. A computer program stored in a non-transitory computer readable storage medium including encoded commands,
   wherein when the computer program is executed by one or more processors of a computer system, the computer program enables the one or more processors to perform operations for parsing, and
   the operations include:
   receiving, by a dispatcher thread, an event and a command message;
   matching, by the dispatcher thread, the event to information on a parsing rule which includes an address on a memory of the parsing rule for referencing the parsing rule stored in a parsing rule map that is a space allocated on the memory corresponding to the event, and storing the event and the matched information on the parsing rule in an event queue on the memory;
   fetching, by a parser thread, the event and the information on the parsing rule matched to the event from the event queue on the memory; and
   processing, by the parser thread, the event according to the parsing rule corresponding to the event and obtained on the parsing rule map based on the information on the parsing rule matched to the event;
   wherein the parsing rule is a processing rule for processing the event, is determined based on the command message and is stored in a parsing rule map located in a memory;
   wherein the parsing rule map includes one or more parsing rules;
   wherein each parsing rule in the parsing rule map has a reference counter which represents the number of events which refer to the parsing rule within the event queue, and the reference counter is updated when an event referring to the parsing rule is added to the event queue; and
   wherein when the parsing rule in the parsing rule map is updated, the updated parsing rule is stored at a different position of the parsing rule map from a position of the existing parsing rule so that the updated parsing rule has a different address from an address of the existing parsing rule.

2. The computer program of claim 1, further comprising:
   removing the parsing rule from the parsing rule map on the memory based on the reference counter of each parsing rule.

3. The computer program of claim 2, wherein the reference counter represents the number of events, which refer to the parsing rule, within the event queue, and
   wherein the removing of the parsing rule from the parsing rule map on the memory based on the reference counter of each parsing rule includes:
   determining whether there is an event referring to the parsing rule within the event queue based on the reference counter which represents the number of events which refer to the parsing rule within the event queue; and
   removing the parsing rule in which there is no event in the event queue that references the parsing rule from the parsing rule map.

4. The computer program of claim 1, wherein the processing, by the parser thread, the event according to the parsing rule corresponding to the event and obtained on the parsing rule map based on the information on the parsing rule includes:
   reading, by the parser thread, the parsing rule in the parsing rule map on the memory based on an address of the parsing rule included in the information on the parsing rule matched to the event, and
   processing the event according to the parsing rule read from the parsing rule map.

5. The computer program of claim 1, further comprising:
   storing, by the dispatcher thread, the parsing rule in a parsing rule map on the memory.

6. The computer program of claim 1, wherein the processing, by the parser thread, of the event according to the parsing rule corresponding to the event based on the information on the parsing rule includes:
   obtaining, by the parser thread, an address on the memory of the parsing rule included in the information on the parsing rule matched to the event;
   reading, by the parser thread, a position in a parsing rule map on the memory indicated by the address of the parsing rule based on the address of the parsing rule and obtaining the parsing rule; and
   processing, by the parser thread, the event based on the obtained parsing rule.

7. A parsing method performed by one or more processors of a computing device, the parsing method comprising:
   receiving, by a dispatcher thread, an event and a command message;
   matching, by the dispatcher thread, the event to information on a parsing rule which includes an address on a memory of the parsing rule for referencing the parsing rule stored in a parsing rule map that is a space allocated on the memory corresponding to the event, and storing the event and the matched information on the parsing rule in an event queue on the memory;

fetching, by a parser thread, the event and the information on the parsing rule matched to the event from the event queue on the memory; and processing, by the parser thread, the event according to the parsing rule corresponding to the event and obtained on the parsing rule map based on the information on the parsing rule matched to the event;

wherein the parsing rule is a processing rule for processing the event, is determined based on the command message and is stored in a parsing rule map located in a memory;

wherein the parsing rule map includes one or more parsing rules;

wherein each parsing rule in the parsing rule map has a reference counter which represents the number of events which refer to the parsing rule within the event queue, and the reference counter is updated when an event referring to the parsing rule is added to the event queue; and wherein when the parsing rule in the parsing rule map is updated, the updated parsing rule is stored at a different position of the parsing rule map from a position of the existing parsing rule so that the updated parsing rule has a different address from an address of the existing parsing rule.

8. A computing device, comprising:
one or more processors; and
a memory configured to store commands executable by the one or more processors,
wherein in the one or more processors,
a dispatcher thread receives an event and a command message, the dispatcher thread matches the event to information on a parsing rule which includes an address on a memory of the parsing rule for referencing the parsing rule stored in a parsing rule map that is a space allocated on the memory corresponding to the event, and stores the event and the matched information on the parsing rule in an event queue on the memory;

a parser thread fetches the event and the information on the parsing rule matched to the event from the event queue on the memory; and the parser thread processes the event according to the parsing rule corresponding to the event and obtained on the parsing rule map based on the information on the parsing rule matched to the event;

wherein the parsing rule is a processing rule for processing the event, is determined based on the command message and is stored in a parsing rule map located in a memory;

wherein the parsing rule map includes one or more parsing rules;

wherein each parsing rule in the parsing rule map has a reference counter which represents the number of events which refer to the parsing rule within the event queue, and the reference counter is updated when an event referring to the parsing rule is added to the event queue; and wherein when the parsing rule in the parsing rule map is updated, the updated parsing rule is stored at a different position of the parsing rule map from a position of the existing parsing rule so that the updated parsing rule has a different address from an address of the existing parsing rule.

* * * * *